(No Model.) 6 Sheets—Sheet 1.

T. L. WALLACE & R. COYLE.
SAW FILING MACHINE.

No. 565,947. Patented Aug. 18, 1896.

WITNESSES:
H. B. Nealy
J. A. Walsh

INVENTORS
Thomas L. Wallace
and Robert Coyle,
BY
Chester Bradford,
ATTORNEY.

(No Model.) 6 Sheets—Sheet 2.

T. L. WALLACE & R. COYLE.
SAW FILING MACHINE.

No. 565,947. Patented Aug. 18, 1896.

WITNESSES:

INVENTORS
Thomas L. Wallace
and Robert Coyle,
BY
Chester Bradford,
ATTORNEY.

(No Model.) 6 Sheets—Sheet 3.

T. L. WALLACE & R. COYLE.
SAW FILING MACHINE.

No. 565,947. Patented Aug. 18, 1896.

WITNESSES:

INVENTORS
Thomas L. Wallace
and Robert Coyle,
BY
Chester Bradford,
ATTORNEY.

(No Model.) 6 Sheets—Sheet 5.

T. L. WALLACE & R. COYLE.
SAW FILING MACHINE.

No. 565,947. Patented Aug. 18, 1896.

WITNESSES:
H. S. Nealy
J. A. Walsh

INVENTORS,
Thomas L. Wallace
and Robert Coyle,
BY
Chester Bradford.
ATTORNEY.

(No Model.) 6 Sheets—Sheet 6.

T. L. WALLACE & R. COYLE.
SAW FILING MACHINE.

No. 565,947. Patented Aug. 18, 1896.

WITNESSES:

INVENTORS
Thomas L. Wallace,
and Robert Coyle,
BY
Chester F. Bradford,
ATTORNEY.

UNITED STATES PATENT OFFICE.

THOMAS L. WALLACE AND ROBERT COYLE, OF INDIANAPOLIS, INDIANA, ASSIGNORS TO THE E. C. ATKINS & COMPANY, OF SAME PLACE.

SAW-FILING MACHINE.

SPECIFICATION forming part of Letters Patent No. 565,947, dated August 18, 1896.

Application filed March 10, 1896. Serial No. 582,632. (No model.)

*To all whom it may concern:*

Be it known that we, THOMAS L. WALLACE and ROBERT COYLE, citizens of the United States, residing at Indianapolis, in the county of Marion and State of Indiana, have invented certain new and useful Improvements in Saw-Filing Machines, of which the following is a specification.

Our present invention consists in various improvements in that class of filing-machines of which that illustrated in application Serial No. 503,346, filed March 12, 1894, wherein one of us, the said Thomas L. Wallace, appears as an inventor jointly with one James A. Reed, is an example, and the object thereof is to secure greater efficiency, accuracy, and durability. Necessarily some of the changes which we have made are of a mere mechanical nature; and we have adopted some devices not of our own invention. Said machine as a whole will, however, be first fully described, and the novel features thereof then specifically pointed out in the claims.

Referring to the accompanying drawings, which are made a part hereof and on which similar letters of reference indicate similar parts, Figure 1 is a top or plan view of a machine embodying our present invention and improvements; Figs. 2$^a$ and 2$^b$, detail sectional views on the dotted lines $a$ $a$ and $b$ $b$, respectively, in Fig. 2; Fig. 4, a vertical sectional view through the clamping mechanism, showing the files and immediately adjacent portions as seen from the dotted line 4 4 in Fig. 5; Fig. 5, a vertical sectional view as seen from the dotted line 5 5 in Fig. 4; Fig. 6, a horizontal sectional view as seen from the dotted line 6 6 in Fig. 5; Fig. 6$^a$, a detail section on the dotted line $z$ $z$ in Fig. 6; Figs. 7 and 8, detail sectional views as seen from the dotted lines 7 7 and 8 8, respectively, in Fig. 4; Fig. 7$^a$, a detail view, much enlarged, similar to a portion of Fig. 7.

The said several figures are scale drawings of the machine, and the scale upon which each figure is drawn is indicated in connection therewith. The direction of sight from the section-lines is indicated by the arrows adjacent to the numerals at the ends of said dotted lines.

In said drawings the portions marked A represent the table of the machine; B, the main or driving shaft thereof; C, crank-shafts from which the files are driven; D, the file-carriages; E, the file-carriage supports; F, the primary one of a system of levers for manipulating said file-carriage supports when it is desired to temporarily raise the files out of operative position; G, screws for adjustably limiting the movement of said file-carriage supports; H, springs whereby the file-carriages are actuated to hold the files onto their work; I, levers whereby the tension of said springs may be regulated; J and J', the gripping-jaws whereby the saw is gripped and held during the operation of the files thereon; K, guide-rolls between which the saw passes while being filed; L, an overhead guide-roll; M, a combined overhead guide-plate and feed-regulator; N, the main feeding-lever; O, the feed-shaft, and P a lever whereby the saw is held up against the guide-roll L and guide-plate M.

Figures 1, 2A, 2B:
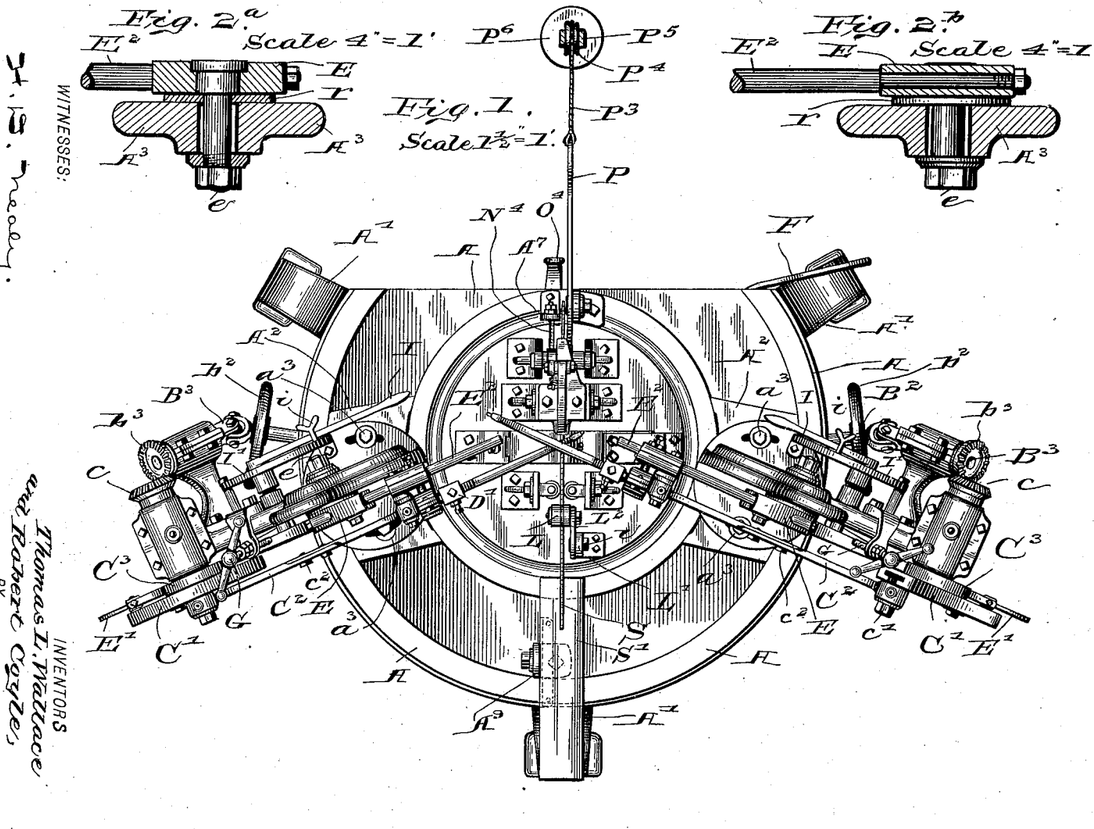

The table A is substantially circular in form and is mounted upon suitable legs A'. That side of said table next which the operator stands is preferably cut square for the double purpose of permitting the operator to stand nearer the work and of enabling the standard carrying base-plates A$^2$ to be more readily inserted. The top of said table is formed with a large annular groove, and one side of said groove preferably has a cut-under or dovetail formation. Both sides of said groove might be similarly formed, although one will be found generally sufficient, and both sides might be made perpendicular, but at some sacrifice of efficiency and convenience, as by the use of said cut-under or dovetail formation the plates are securely held in place and from tipping by merely tightening the set-bolts $a^2$, dispensing with some bolts which would be otherwise required and the use of which would entail the employment of additional time and labor in adjusting the machine. Mounted upon these base-plates A² are the standards A³, the bases whereof, as shown in Fig. 1, are circular in form and have curved slots formed therein through which bolts $a^3$ pass and enter the base-plates A², and by which said standards are secured to said base-plates. As will be readily seen, by loosening these bolts $a^3$ the standards may be swiveled on said base-plates, and the position of the files at the point of contact with the saw thus varied. Each standard carries one group of saw-filing mechanism, and the position of such group relative to the saw-holding mechanism may be varied as a whole by sliding the base-plate carrying said group around in the annular groove in the top of the table A. Such plates when so adjusted are clamped firmly in place by the single set-bolts $a^2$. (Shown in Figs. 2 and 3.) Were the cut-under or dovetailed edge not provided, it would be necessary to have additional bolts passing through said plates, and numerous holes bored in the table to receive them when the plates were adjusted to the varying positions. As before stated, therefore, this construction secures greater efficiency and economy of manipulation.

Figures 9, 10:
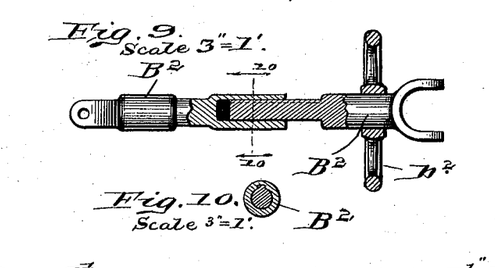
Fig. 9, a detail partially sectional view of one of the longitudinally-adjustable shaft-sections.
Fig. 10, a transverse sectional view of the same, and Fig. 11 a horizontal sectional plan view as seen from the dotted lines 11 11 in Figs. 2 and 3.
Figure 11:
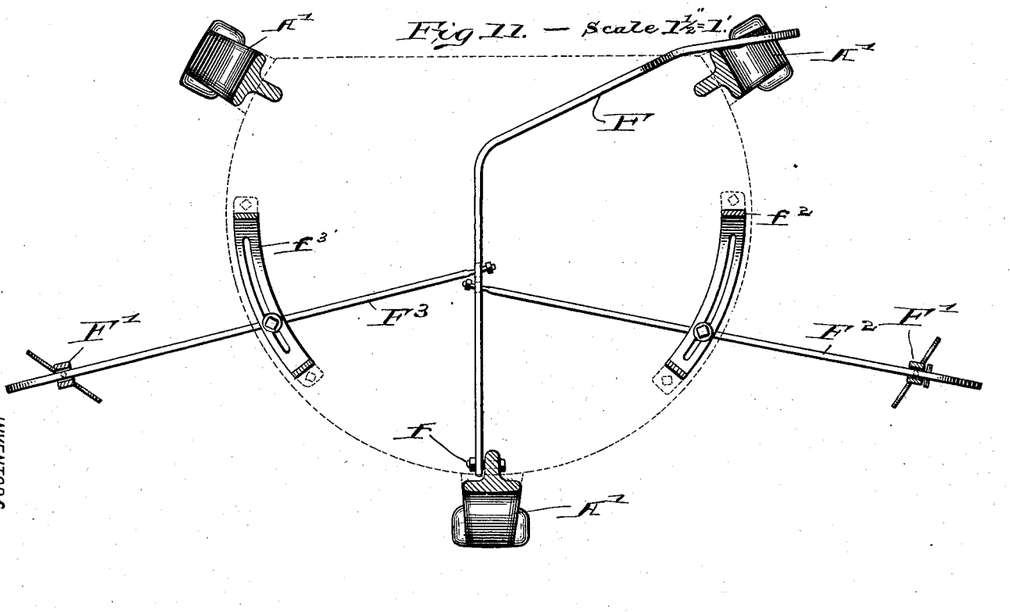

The main driving-shaft B is located horizontally below the table of the machine and mounted in hangers A⁴ thereon. The machine is driven by a belt running from said suitable source of power (not shown) to a pulley B' on said shaft. This shaft has extensions or continuations B² and B³, coupled together by universal joints, and the latter of said extensions have bevel-gears, through which, and similar bevel-gears on the crank-shafts C, said crank-shafts are driven. Said shaft portions B², as shown most plainly in Figs. 9 and 10, are each composed of two parts, which are telescopically united, so that the shaft portions as a whole are automatically adjustable in length, but are caused to rotate together by means of a spline formation, as shown most plainly in Fig. 10. This is necessary in this machine to accommodate the varying positions of the groups of file mechanism relatively to the shaft without the trouble and inconvenience of making separate adjustments of the shafts each time the positions of the file mechanisms are changed. Said main shaft B also carries the spur gear-wheel B⁴ and the cam B⁵, by which various parts of the mechanism are operated, as will be explained in connection with said parts. It is also generally the case when a saw is placed in a machine that the operative parts of the mechanism will be found so positioned in relation to each other that the file will not strike at exactly the right point. This may be remedied by independently revolving the shafts until the proper relation is obtained or restored, and for this purpose we have provided upon the shaft portions B² hand-wheels $b^2$, by which the said shafts may be revolved slowly by hand until exactly the desired position is obtained, as will be readily understood.

The crank-shafts C are mounted in suitable bearings on extensions of the standards A³ and are driven from the main shaft B through its extensions B² and B³ and the gear-wheels $b^3$ and $c$. They carry on the opposite ends from said gears crank-wheels C', which are formed heaviest on the sides opposite to where the pitmen C² are attached thereto. The wrist-pins $c'$ are secured in radial slots in said crank-wheels, and thus the stroke may be varied as desired. There is also secured on each of said crank-shafts a cam-wheel C³, which operates through the lever E' on the corresponding file-carriage support to raise the file-carriage and lift the file out of contact during the return movement thereof. The pitmen C² are made in parts secured together by bolts $c^2$ passing through suitable slots therein, and are thus adjustable in length, so that the stroke may be adjusted and the file carried to just the desired point. This is sometimes necessary where different kinds of files are used in utilizing the entire operative portions thereof.

Figures 4, 7, 7A, 8:
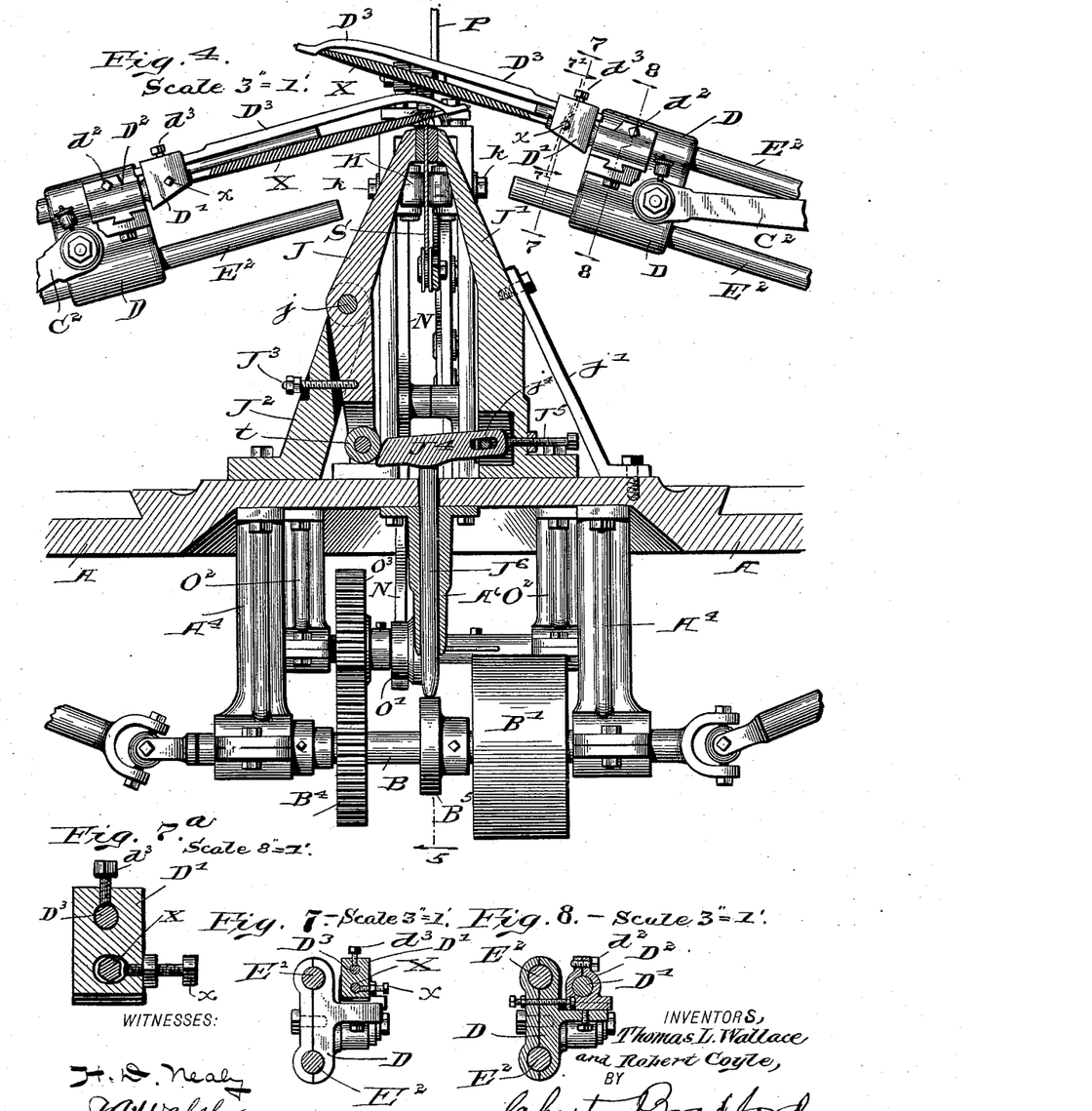

The file-carriages D are mounted on slide-rods E², forming part of the file-carriage supports, and are moved back and forth thereon by the pitmen C². The file-holders D' are secured to the file-carriages by suitable clamping-jaws D², operated by the bolts $d^2$, and have suitable perforations to receive the shanks of the files X. File-point supports D³ extend out from these file-holders D' and engage the point of the file, as shown most plainly in Fig. 4, and are held in place by the clamping-screws $d^3$. The shanks of the files X may be firmly held, if desired, by means of the screws $x$; but we have discovered by experiment that the file-shanks should be somewhat loose in their sockets, so as to permit the rear end of the file a slight lateral movement. Said screws $x$ are therefore preferably not driven up, but left off slightly from the sides of the file-shanks, as best illustrated in Fig. 7ª. Said files are, however, preferably held rigidly at the points, in the sockets formed therefor, at the outer ends of the file-point supports D³.

Figure 2:
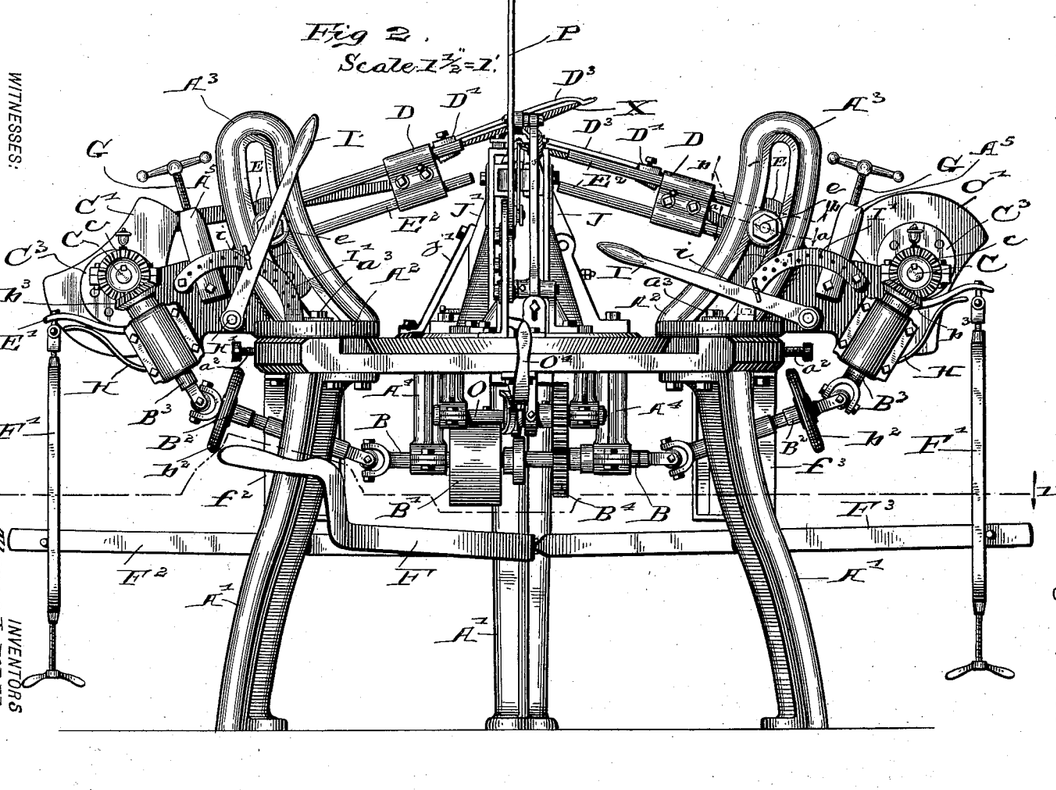
Fig. 2, a front side elevation.
Figure 3:
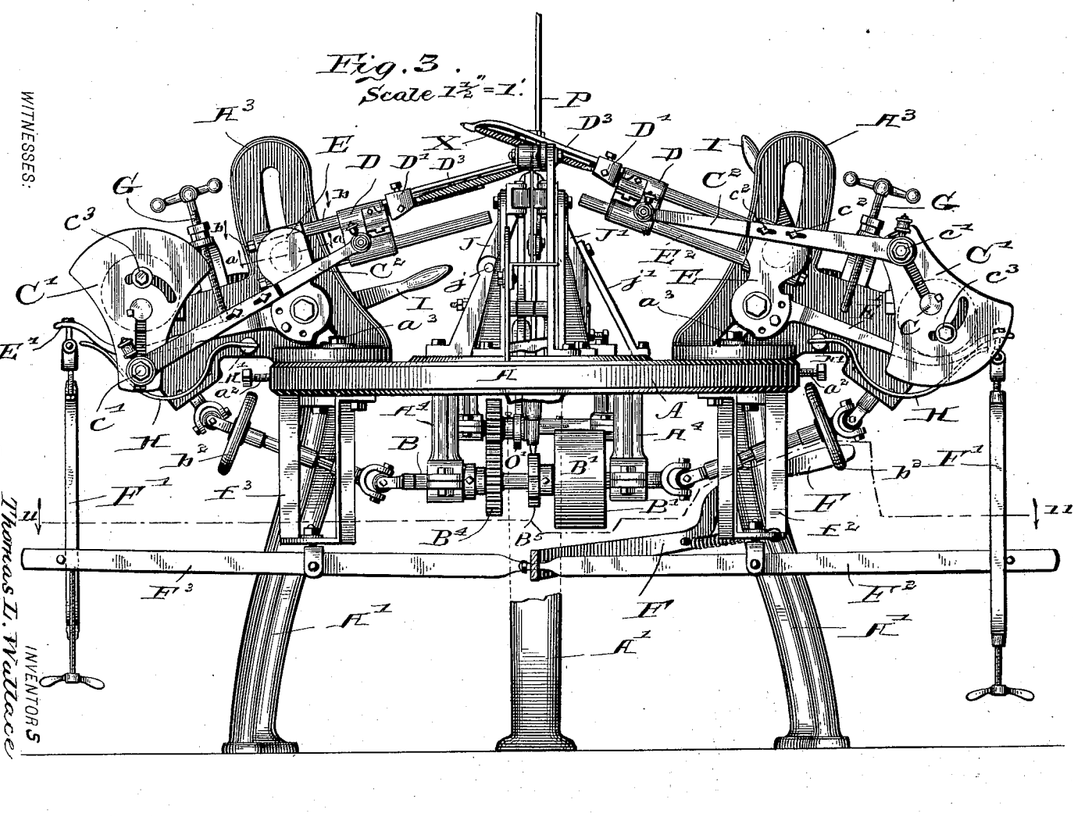
Fig. 3, a rear side elevation.

The file-carriage holders E are secured to the standards A³ by suitable clamping-bolts $e$, as shown in Figs. 1, 2, 2ª, and 2ᵇ, which bolts pass through the curved slots in said standards and are adapted to clamp said file-carriage supports at any point thereon. Said slots are curved and are bounded by lines struck from the point where the files come in contact with the saw, so that any elevation or depression of these file-carriage holders will not serve to vary the distance between the ends of the slides E², forming part thereof, and said point of operation. The means of connecting the bodies of these file-carriage supports to the standards is best illustrated in Figs. 2 and 2ª, where the bolt $e$ is shown as shouldered, with a washer $r$ interposed between the inner shoulder and the standard, and the construction whereby the slide-rods E² are connected to the body of the file-carriage holder is best shown in Fig. 2$^b$, where one of said rods is shown as shouldered and held in place by a nut. Each of the arms E' is secured to a downwardly-projecting portion of the file-carriage support E and extends (in the opposite direction from the slide-rods E$^2$) below the crank-shaft C and into the path of the cam C$^3$. Said file-carriage supports are mounted to rock on the bearings which support them and by which they are connected to the standards A$^3$, and consequently the operation of these arms, as actuated by said cams, is to periodically raise the file-carriage supports, file-carriages, and files carried thereby. This operation is so timed that the files are raised out of contact with their work just at the end of the forward stroke, and are so held during their return movement, and are permitted to drop into contact with said work as they begin their forward movement. As shown most plainly in Fig. 3, the cams are rendered adjustable on the shafts C, being loosely mounted thereon and secured by bolts $c^3$ to the crank-wheels C', said bolts passing through said slots in said cam-wheels. The adjustment is effected by loosening the bolts, moving the cams in relation to the cam-wheels, and retightening the bolts, as will be readily understood. These arms E' also have upon the outer ends hangers F', whereby by means of suitable lever connections, as will be hereinafter explained, said file-carriage supports, file-carriages, and files may be lifted and held out of operative position without otherwise interfering with the motion of the machine.

The lever F is pivoted to one of the legs A' of the framework by a pivot $f$ and extends over to a suitable point adjacent to the operator's position, so that it may be conveniently operated. Two other intermediate levers F$^2$ and F$^3$ are carried by hangers $f^2$ and $f^3$, depending from the table A, and extend out and engage with the hangers F', depending from the lever-arms E' on the file-carriage supports. This forms a connected system of levers, whereby by manipulating the single lever F the rocking file-carriage supports are rocked and the files simultaneously lifted out of operative position. This is frequently of advantage where it is desired to stop the filing temporarily, for purposes of adjusting the machine, without shutting down the machine as a whole.

The screws G are mounted in appropriate bearings therefor in arms A$^5$ on extensions of the standards A$^3$, and their points extend down toward the arms E'. Said screws form movement-limiting stops for said arms, so that when the cams are free therefrom said arms shall only be enabled to move upwardly until they come in contact with said screws and the files thus prevented from dropping farther than is desired. This device is especially useful in prolonging the wearing capacity of the files, as new sharp files should come in contact with their work with less force, in order to obtain the best results, than older or partly-worn files. By adjusting these screws G so that the files will just barely come in contact with their work when said files are new and by raising them a trifle as the work progresses and the files become worn the best results are attained.

The springs H are carried by small rock-shafts H', mounted in bearings in the extensions of the standards A$^3$, and their free ends bear against the under sides of the arms E', the normal tendency of said springs being to force said arms upwardly toward the screw-stop G, while the force of said springs is overcome as the cams revolve into contact with said arms and force them downwardly. It is desirable to vary the contact force of the files with the saw at various periods during the filing operation. As already indicated, when the files are new and sharp they should come in contact with the saws being filed with only slight force, and as the files become worn greater force should be applied until finally when the files are nearly worn out they will operate satisfactorily only under a considerable pressure. In order to obtain this result, we have provided the levers I on the opposite ends of the small rock-shafts H' and have also provided suitable stops for said levers, whereby they can be held to any one of numerous points. These stops preferably consist of pins $i$, entering suitable perforations in segments I'. In Fig. 2 different conditions are illustrated. At the left hand the lever I is shown as thrown over about half-way, indicating that the file on that side of the machine is in medium condition, while the lever at the right hand of said figure is thrown down to substantially its full extent, indicating that the file in use in that side of the machine is badly worn and almost ready to be thrown away.

The gripping-jaws J and J' are arranged centrally of the bed-plate A, directly below where the files are designed to operate, and serve to grip the blade of the saw S firmly just below the roots of the teeth and hold it securely while being filed. The jaw J is mounted by means of a pivot $j$ on a standard J$^2$, which latter is secured firmly to the table A. The jaw J' is secured directly to said table, and for greater rigidity may have a brace $j'$, all as shown most plainly in Fig. 4. The outward movement of the jaw J is limited by the stop-bolt J$^3$, which passes through a perforation in the standard J$^2$ and enters the lower arm of said jaw J. It is operated in the other direction to grip the saw by the lever J$^4$, which is mounted in a recess in the lower end of the jaw J', and there secured by a pivot $j^4$, passing through said jaw in its recess and through a slot in said lever. Its position longitudinally is determined by the adjusting-bolt J$^5$, which is also mounted in a suitable screw-threaded perforation in the lower end of the jaw J', and the inner end of which contacts with the adjacent end of said lever. The opposite end of said lever is cam-shaped and comes in contact with the lower end of the jaw J, which preferably has an antifriction-truck $t$ to serve as the contact-surface. Directly below said lever $J^4$ is a rod $J^6$, which extends down through a long bearing $A^6$, provided therefor, into the path of the cam-wheel $B^5$ on the shaft B, as plainly shown in Figs. 4 and 5. The operation is, as said cam-wheel revolves, driven by said shaft, that forces the rod $J^6$ upwardly, raising the lever $J^4$, causing it to operate in connection with the jaw J after the method of a toggle and causing said jaw to travel toward the jaw J' and grip the saw, and this gripping continues so long as that portion of the cam having the larger diameter is in contact with said rod. When the portion of the cam which is cut away, or of smaller diameter, reaches a position next to the rod, it permits said rod to drop and the jaws to separate, thus releasing the saw, so that it may be fed forward by the feeding mechanism, as will be presently explained.

The rollers K are adjustably mounted at or near the upper ends of the standards K' and serve to guide the saw while it is being operated upon and hold it to the proper horizontal position. The position of these rollers can be adjusted, as will be readily understood, by loosening the bolts $k$, by which they are held, moving the rollers to the desired position, and retightening said bolts.

Figures 5, 6, 6A:
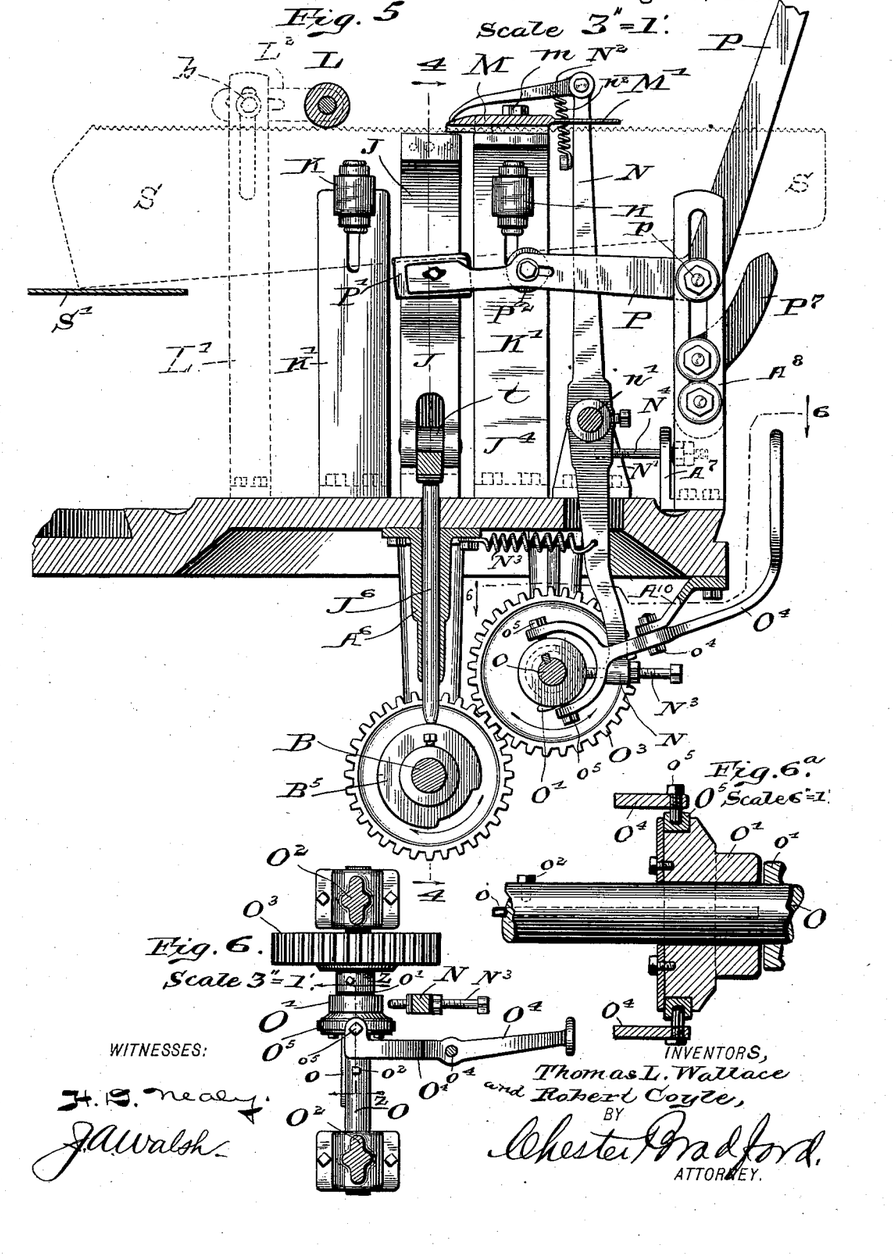

The roller L is adjustably mounted at the upper end of the standard L' upon an arm $L^2$, as shown in Fig. 1 and by means of the dotted lines in Fig. 5. As will be readily understood, this roller can also be readily adjusted by manipulating the bolt $l$. As said roller comes in contact with the points of the teeth of the saw after they are filed or sharpened, it is necessary that it should be of some yielding material not calculated to dull said points. It is also desirable that the rollers K should be of material having some degree of resiliency for obvious reasons.

The plate M is secured upon the upper end of standards therefor (which may be and preferably are also the standards carrying one pair of the rollers K) and is held adjustable thereon, as may be required, by manipulating the bolt $m$. It has a tailpiece or extension M', which extends out and serves also to support and guide the lever N of the feeding mechanism, the upper end of which passes up alongside said tailpiece.

The feeding mechanism is composed of the lever N, which is mounted by means of a pivot $n'$ on a suitable bearing-standard N' on the table A; a pawl $N^2$, carried by the upper end of said lever and held downwardly onto the guide-plate M by a spring $n^2$; a cam-wheel O' on the shaft O, whereby said lever is actuated in one direction, and a spring $N^3$, whereby said lever is actuated in the other direction. The pawl $N^2$ is adapted to engage with the teeth of the saw when moving forwardly and so force the saw the distance desired; but when moving backwardly it is drawn up onto the guide-plate M out of contact with said saw. By adjusting said guide-plate M, therefore, the proportion of the stroke of the pawl which shall operate upon the saw is regulated, as will be readily understood, it being obvious that by moving the guide-plate farther under the pawl said pawl will be the sooner raised out of engagement with the saw on its return movement. At its lower end said lever N is provided with the adjustable contact-point $N^3$, which extends into the path of the cam O' and is operated thereby. It is, of course, necessary that the feeding mechanism should be adjusted for longer or shorter strokes to accommodate saws having coarser and finer teeth, and consequently that the contact-point $N^3$ should be kept from continuous contact with the cam O'. We have therefore provided an arm $N^4$ on the lever N, which extends out and passes loosely through a slot or perforation in a standard $A^7$. The manifest office of this device is to limit the movement of the lower end of the lever N toward the cam O', and consequently to keep the contact-point $N^3$ from actual contact with said cam during such portion of the revolution of the latter as may be determined by the adjustment of the parts. Obviously the farther away from the cam-shaft the contact-point is held the smaller will be the operation on the feeding mechanism, thus adapting the machine to the finer-toothed saws, while the reverse adjustment secures the proper condition for saws with coarser teeth.

The shaft O is a short shaft carried by hangers $O^2$ and is driven from the shaft B' through the gears $B^4$ and $O^3$. It carries the cam O', which operates the lever N of the feeding mechanism, as above described. The form of this cam is best indicated in Fig. 5, all except the highest portion thereof being shown by means of dotted lines. It frequently happens that it is desired to stop the feeding of the saw forward without completely shutting down the machine, as the latter operation involves more labor and greater loss of power than should be expended in this operation, if it can be avoided. We have therefore provided a means whereby the cam may be shifted into and out of engaging relation with the contact-point $N^3$ of the lever N. Said cam O' is held from revolving on the shaft O by means of a spline $o$, and a lever $O^4$ is mounted, by means of a pivot $o^4$, on a bracket $A^{10}$, extending downwardly from the frame A, which engages with and is adapted to shift this cam-wheel back and forth along the shaft O in much the same manner as the movable part of a clutch is shifted, its point $o^5$ engaging with a ring $O^5$, lying in a groove in the body of an extension on the cam O'. Its movement is limited in one direction by a collar $o'$ and in the other direction by a pin $o^2$ or another collar, as may be preferred, collars and pins being of course equivalents for this purpose.

The saw, while being filed, is supported vertically by the lever P, which is mounted on the pivot $p$, carried by a standard $A^8$ on the table A. Said standard is slotted so that said pivot may be adjusted vertically to accommodate the lever to saws of varying widths. Said lever is provided with a pivot-block P', preferably having a groove in its face to receive the back of the saw at its end and which may be adjusted, and also with a grooved roller $P^2$, which should also be adjustable, said block and said roller coming in contact with the back of the saw, which rests in the grooves therein. As shown in Fig. 1, a rope $P^3$ is carried from the upper end of this lever over a sheave $P^4$, supported by hangers $P^5$ on the framework of the building, (not shown,) which rope extends thence downwardly and carries a weight $P^6$ on its lower end. This weight can be varied as desired, and the amount of force with which the saw is held upwardly against the guide-roller L and guide-plate M thus determined. The lever is limited in its movement by a stop $P^7$, carried by the same standard $A^8$, and said stop is adjustable, so as to hold said lever at any point. The purpose is to prevent the lever from falling much beyond the point to which it necessarily goes in following the saw to its narrowest portion.

The saw S may of course be any saw which it is desired to sharpen; but we have shown a construction and arrangement of guides and supports peculiarly adapted for that variety of saws known as "handsaws," one of which is shown in outline by means of dotted lines in Fig. 5 of the drawings. Said saw is supported, further, as it leaves the mechanism which has been described, by an adjustable plate S', carried by a standard $A^9$, Fig. 1, on the frame A, said plate being adjusted to substantially the point where the widest portion of the saw being operated upon will rest thereon as it is fed along through the machine, as is indicated most plainly in Fig. 5. This plate prevents any undue strain on the supporting and clamping mechanisms as the saw approaches the point of completion of the filing operation, when without this or some equivalent device the strain would be much greater than at other points, as will be readily understood.

We have discovered by experiment that in filing-machines of this character, where the files approach each other at differing angles, it is necessary, in order to file the teeth of the saw equally upon both sides, that the files themselves shall be cut oppositely, or with the angles of the cuts so positioned that lines projected therefrom would cross each other. We have illustrated this in Fig. 4 of the drawings, while the differing angles of the files in operation are indicated in Fig. 1. This feature is of great importance, as without it it is substantially impossible to do perfect work, for where both files are cut alike one, being presented to the surface of the saw differently from the other, cuts faster, and thus the points of the saw-teeth set in one direction will be filed shorter than those set in the other direction. As before stated, also, it is very desirable that the rear ends or shanks of the files X should be loosely mounted in their sockets, as is best shown in Fig. 7ª. Heretofore files have been held and driven from their shanks; but we have clamped our files in the holders $D^3$ at the point and leave the shanks loose, as shown. This manner of holding the file compensates for any irregularities, both those which may be present in the files themselves and those in the parts in the machine by which said files are driven, and thus the operation of the file upon the saw-tooth is rendered substantially perfect.

Having thus fully described our said invention, what we claim as new, and desire to secure by Letters Patent, is—

1. The combination, in a filing-machine, of a table having an annular groove or channel in its surface, a saw holding and feeding mechanism centrally located within the space bounded by said groove, and filing mechanism mounted on a base-plate secured within said groove, whereby, by adjusting said base-plate, the relation of said filing mechanism to said saw-holding mechanism may be adjusted, substantially as set forth.

2. The combination, in a saw-filing machine, of a table containing an annular groove, a saw-holding mechanism secured to said table within the space bounded by said groove, and two separate filing mechanisms mounted on base-plates secured within said groove, each of which is adjustable therein, whereby either or both the filing mechanisms can be varied in relation to the saw-holding mechanism and to each other, substantially as shown and described.

3. The combination, in a filing-machine, of a table having an annular groove one side of which is cut under or dovetailed in form, base-plates carrying mechanism mounted in said groove, and set-screws extending in through the rim of said table into said groove and adapted to bear against base-plates, whereby said base-plates may be securely clamped in any desired adjusted position by the use of said set-screws only, substantially as shown and described.

4. A table for a saw-filing machine circular in form and having one side cut away or squared off, and provided with an annular groove in its surface the ends of which are open at said cut-away or squared side of the table, whereby plates may be introduced into the ends of said groove, substantially as set forth.

5. The combination, in a filing-machine, of a circular table, a saw-holding mechanism mounted centrally on said table, filing mechanisms adjustably mounted at or near the edge of the table, a main shaft mounted in hangers below the table having extensions connected thereto by universal joints, whereby it is connected to and drives said filing mechanism, one extension-piece on each side of the machine being telescopically adjusted, whereby the filing mechanisms can be adjusted about the machine without changing the shafts, substantially as shown and described.

6. The combination, in a filing-machine, of a table having an annular groove, base-plates secured within said groove, standards adjustably secured on said base-plates, filing mechanisms secured on said standards, and saw clamping and feeding mechanisms secured centrally on said table, whereby said filing mechanisms are rendered adjustable circumferentially of the table and pivotally on their base-plates, substantially as shown and described.

7. The combination, in a saw-filing machine, of the table, saw clamping and feeding mechanisms secured centrally on said table, filing mechanisms secured at or near the edge of the table on standards mounted on said table, said standards having curved slots bounded by lines struck from the point of operation of the files, file-carriage supports secured in said slots, file-carriages mounted thereon, crank-shafts mounted on extensions to said standards, crank-wheels on said crank-shafts, and pitmen connecting said crank-wheels to the file-carriages, substantially as shown and described.

8. In a saw-filing machine, the combination of the saw-holding mechanism, means for intermittingly operating said mechanism, the feeding mechanism, means for disengaging said feeding mechanism from the operating mechanism, the filing mechanism, means for throwing said filing mechanism out of operation, a main shaft, connections between said main shaft and each of the other mechanisms, and means for operating said shaft by hand, whereby the desired relation between the several mechanisms may be secured or restored, substantially as set forth.

9. The combination, in a saw-filing machine, with a file-carriage, of a file-carriage support consisting of a rocking head having slides for the file-carriage extending in one direction, an arm extending in the other direction, the crank-shaft, and a cam on said crank-shaft adapted to come in contact with and operate the arm on the file-carriage support, substantially as shown and described.

10. The combination, in a saw-filing machine, with the file-carriage support having an arm extending out in the path of the cam on the crank-shaft, of a spring mounted on a rock-shaft and operating reversely to said cam, a lever on said rock-shaft, and means for holding said lever into adjusted position, whereby said spring is caused to exert greater or less force on said arm, and through the same and connected parts upon the file, thus adapting the filing-pressure to the condition of the file.

11. The combination, in a filing-machine, of the crank-shaft, the crank-wheel thereon, the file-carriage, a pitman connecting said crank-wheel and said file-carriage, a cam mounted and circumferentially adjustable on said crank-shaft, and a file-carriage support having an arm extending into the path of said cam, substantially as shown and described.

12. The combination, in a filing-machine, with a rocking file-carriage support, and its rocking mechanism, of adjustable screws G adapted to limit the movement of said rocking support in one direction, thus securing a control of the file-contact, substantially as shown and described.

13. The combination, in a saw-filing machine, of rocking file-carriage supports having arms extending out therefrom, hangers depending from said arms, and a system of connected levers for simultaneously operating the same, and thus, through said hangers and file-carriage supports, simultaneously raising the several files of the machine out of operative position, substantially as shown and described.

14. The combination, in a saw-filing machine, of the stationary gripping-jaw, the pivoted gripping-jaw, a toggle-lever operating between the lower ends of said jaws, a vertical rod operating said toggle-lever, and a cam on a shaft below the table operating said rod.

15. In a saw-filing machine, the combination, of the saw-supports, the saw-clamping mechanism, the adjustable plate, M, mounted in a horizontal plane above the edge of the saw, the saw-feeding lever pivoted to a suitable part of the frame, and carrying a pawl on its upper end the point of which is arranged to slide over said plate, M, a spring connected thereto and to said lever for holding said pawl down upon said plate, an operating shaft and cam engaging with the lower end of said lever for operating it, and adjusting devices for limiting and controlling its stroke, substantially as set forth.

16. The combination, in a saw-filing machine, of the two saw-clamping jaws, one stationary and the other pivoted, and a toggle-lever $J^4$ one end whereof is mounted on a pivot in a recess in the lower end of the stationary jaw, and the other end of which contacts with the pivoted jaw or an antifriction-truck carried thereby, an adjusting-screw $J^5$ whereby the extent of operation of said toggle-lever is determined, and means for operating said toggle-lever, substantially as set forth.

17. In a saw-filing machine, the combination, of the adjustable guide-plate, M, having the guide or tailpiece, M′, the saw-feeding lever pivoted with its upper end resting on and adapted to travel against said tailpiece, the pawl pivoted to the upper end of said lever and adapted to travel over said plate and engage with the saw and feed it along, and the mechanism for operating said lever, substantially as set forth.

18. In a saw-filing machine, the combination, of the centrally-located clamping mechanism, the filing mechanism located on each side of said clamping mechanism, and mounted on adjustable bases, a saw-feeding mechanism consisting of a pivoted lever provided with a pawl to engage and feed the saw its opposite end extending down alongside a shaft, said shaft provided with a cam which engages said end of said lever and operates it, substantially as set forth.

19. The combination, in a feeding mechanism for a filing-machine, with the main lever thereof, of a cam whereby said lever is operated, and a shifting-lever whereby said cam may be shifted into or out of operative relation with said feeding-mechanism lever, substantially as shown and described and for the purpose specified.

20. The combination, in a saw-filing machine, with the saw clamping and guiding devices, of a supporting-lever P, one arm whereof is in contact with and supports the back of the saw, and the other arm whereof is provided with a weight whereby said contact is made continuous notwithstanding the varying width of the saw and the consequent varying position of the support required as the saw passes through the machine, substantially as shown and described.

21. The combination, in a saw-filing machine, with the saw clamping and guiding devices, of a saw-supporting lever P having adjustable supporting-contact devices secured to one arm thereof which come in contact with the back of the saw in operation, and a weight connected to the other arm of the lever, substantially as shown and described.

22. In a saw-filing machine, the combination of the rest for the saw carried by a horizontal arm of a pivoted lever, said lever mounted adjustably on a pivot, a weight connected to the other end of said lever, and an adjustable stop therefor, substantially as set forth.

23. In a saw-filing machine embodying two filing mechanisms, the files whereof approach the saw from both sides and at opposite angles, files having oppositely-cut surfaces, whereby both files are caused to operate alike upon the saw-teeth notwithstanding the different angles at which they are set.

24. In a filing-machine, file-holders adapted to hold the files rigidly at the point, and provided with loose sockets for the shanks, whereby inequalities are compensated for, substantially as shown and described.

In witness whereof we have hereunto set our hands and seals, at Indianapolis, Indiana, this 5th day of March, A. D. 1896.

THOMAS L. WALLACE. [L. S.]
ROBERT COYLE. [L. S.]

Witnesses:
CHESTER BRADFORD,
JAMES A. WALSH.